US012639847B2

(12) United States Patent
Yoshida et al.

(10) Patent No.: US 12,639,847 B2
(45) Date of Patent: May 26, 2026

(54) IMAGE PROCESSING APPARATUS, IMAGE PROCESSING METHOD, AND NON-TRANSITORY STORAGE MEDIUM

(71) Applicant: NEC Corporation, Tokyo (JP)

(72) Inventors: Noboru Yoshida, Tokyo (JP); Tingting Dong, Tokyo (JP)

(73) Assignee: NEC CORPORATION, Tokyo (JP)

( * ) Notice: Subject to any disclaimer, the term of this patent is extended or adjusted under 35 U.S.C. 154(b) by 215 days.

(21) Appl. No.: 18/232,099

(22) Filed: Aug. 9, 2023

(65) Prior Publication Data

US 2024/0062417 A1 Feb. 22, 2024

(30) Foreign Application Priority Data

Aug. 22, 2022 (JP) ................................. 2022-131659

(51) Int. Cl.

| | |
|---|---|
| ***G06V 40/10*** | (2022.01) |
| ***G06T 7/11*** | (2017.01) |
| ***G06T 7/73*** | (2017.01) |
| *G06V 10/764* | (2022.01) |

(52) U.S. Cl.

CPC .................. *G06T 7/74* (2017.01); *G06T 7/11* (2017.01); *G06T 2207/30196* (2013.01); *G06T 2207/30244* (2013.01); *G06V 10/764* (2022.01)

(58) Field of Classification Search

CPC ............ G06T 7/74; G06T 7/70; G06V 40/103

See application file for complete search history.

(56) References Cited

U.S. PATENT DOCUMENTS 9,400,925 B2 7/2016 Bourdev
2014/0067782 A1* 3/2014 Waupotitsch ....... G06F 16/9536 707/706
2014/0201126 A1* 7/2014 Zadeh .................... A61B 5/165 706/52
2014/0270363 A1* 9/2014 Chakraborty .......... G06V 40/16 382/103
2014/0270482 A1* 9/2014 Chakraborty .......... G06V 20/10 382/154

(Continued)

FOREIGN PATENT DOCUMENTS

JP 2006-092396 A 4/2006
JP 2009-075868 A 4/2009

(Continued)

OTHER PUBLICATIONS

JP Office Action for JP Application No. 2022-131659, mailed on Mar. 17, 2026 with English Translation.

*Primary Examiner* — Jayanti K Patel
(74) *Attorney, Agent, or Firm* — Sughrue Mion, PLLC

(57) ABSTRACT

To improve accuracy of processing of searching for an image including a desired person from a plurality of images, the present invention provides an image processing apparatus 10 including: an acquisition unit 11 that acquires a search query including pose information indicating a pose of a body of a person and appearance information indicating an appearance of a person; and a search unit 12 that searches for an intended image from a plurality of reference images by using partial pose information indicating a pose of a part of a body of a person in the pose information included in the search query, and partial appearance information being a part of the appearance information included in the search query.

11 Claims, 11 Drawing Sheets

(56) References Cited

U.S. PATENT DOCUMENTS

| | | | | |
|---|---|---|---|---|
| 2015/0078628 | A1* | 3/2015 | Anderson | G06F 18/22 382/218 |
| 2016/0328872 | A1* | 11/2016 | Hauswiesner | G06T 7/593 |
| 2019/0354659 | A1* | 11/2019 | Barillari | G06F 16/5866 |
| 2022/0245926 | A1 | 8/2022 | Huang et al. | |

FOREIGN PATENT DOCUMENTS

| | | | |
|---|---|---|---|
| JP | 2011-018238 | A | 1/2011 |
| JP | 2018-045287 | A | 3/2018 |
| JP | 2018-057596 | A | 4/2018 |
| JP | 2019-091138 | A | 6/2019 |
| JP | 2020-047110 | A | 3/2020 |
| WO | 2021/138749 | A1 | 7/2021 |
| WO | 2022/079795 | A1 | 4/2022 |
| WO | 2022/091166 | A1 | 5/2022 |

* cited by examiner

FIG. 4

| REFERENCE IMAGE IDENTIFICATION INFORMATION | POSE INFORMATION | APPEARANCE INFORMATION | . . . . |
|---|---|---|---|
| R000001 | * * * | $F_1$ : YES<br>$F_2$ : NO<br>$F_3$ : RED<br>$F_4$ :<br>⋮ | . . . . |
| ⋮ | ⋮ | ⋮ | ⋮ |

IMAGE PROCESSING APPARATUS, IMAGE PROCESSING METHOD, AND NON-TRANSITORY STORAGE MEDIUM

This application is based upon and claims the benefit of priority from Japanese patent application No. 2022-131659, filed on Aug. 22, 2022, the disclosure of which is incorporated herein in its entirety by reference.

TECHNICAL FIELD

The present invention relates to an image processing apparatus, an image processing method, and a program.

BACKGROUND ART

A technique related to the present invention is disclosed in Patent Document 1 (International Patent Publication No. WO2022/079795), Patent Document 2 (Japanese Patent Application Publication No. 2018-045287), and Patent Document 3 (Japanese Patent Application Publication No. 2006-92396).

Patent Document 1 discloses that an image search is performed by using pose information and other information about a person. Then, it is disclosed that the other information is color information (may be classified by portion of a person) about a person or a wearing object, face information, gender, an age group, a body shape, a position in an image, and the like.

Patent Document 2 discloses a technique for tracking a person in a video, based on a color, a pattern, a shape, a height, an aspect ratio, and the like of a person.

Patent Document 3 discloses a technique for deciding a lone person or a person in a group, and the like, based on a face image, build, age, gender, clothing, and the like of a person.

DISCLOSURE OF THE INVENTION

An image including a desired person can be searched with high accuracy by performing an image search by using various types of information (such as gender, age, a body shape, a pose, clothing, and a position in an image).

Incidentally, an input of an image is conceivable as one example of a method for inputting a search query. In this case, when an image in which a part of the various types of information described above is not a desired content is set as a search query, there is a problem that accuracy for searching for an image including a desired person decreases. The problem can be solved by setting, as a search query, an image in which all of the various types of information described above is a desired content. However, it requires a great deal of labor to find an image in which all of the various types of information described above is a desired content. None of Patent Documents 1 to 3 discloses the problem and a means for solving the problem described above.

One example of an object of the present invention is, in view of the problem described above, to provide an image processing apparatus, an image processing method, and a program that solve a challenge to improve accuracy of processing of searching for an image including a desired person from a plurality of images.

One aspect of the present invention provides an image processing apparatus including:

- an acquisition unit that acquires a search query including pose information indicating a pose of a body of a person and appearance information indicating an appearance of a person; and
- a search unit that searches for an intended image from a plurality of reference images by using partial pose information indicating a pose of a part of a body of a person in the pose information included in the search query, and partial appearance information being a part of the appearance information included in the search query.

One aspect of the present invention provides an image processing method including, by one or more computers:

- acquiring a search query including pose information indicating a pose of a body of a person and appearance information indicating an appearance of a person; and
- searching for an intended image from a plurality of reference images by using partial pose information indicating a pose of a part of a body of a person in the pose information included in the search query, and partial appearance information being a part of the appearance information included in the search query.

One aspect of the present invention provides a program causing a computer to function as:

- an acquisition unit that acquires a search query including pose information indicating a pose of a body of a person and appearance information indicating an appearance of a person; and
- a search unit that searches for an intended image from a plurality of reference images by using partial pose information indicating a pose of a part of a body of a person in the pose information included in the search query, and partial appearance information being a part of the appearance information included in the search query.

One aspect of the present invention achieves an image processing apparatus, an image processing method, and a program that solve a challenge to improve accuracy of processing of searching for an image including a desired person from a plurality of images.

BRIEF DESCRIPTION OF THE DRAWINGS

The above-described object, the other objects, features, and advantages will become more apparent from suitable example embodiment described below and the following accompanying drawings.

FIG. 4 is a diagram schematically illustrating one example of information processed by the image processing apparatus.

DESCRIPTION OF EMBODIMENTS

Hereinafter, example embodiments of the present invention will be described with reference to the drawings. Note that, in all of the drawings, a similar component has a similar reference sign, and description thereof will be appropriately omitted.

First Example Embodiment

Figure 1:
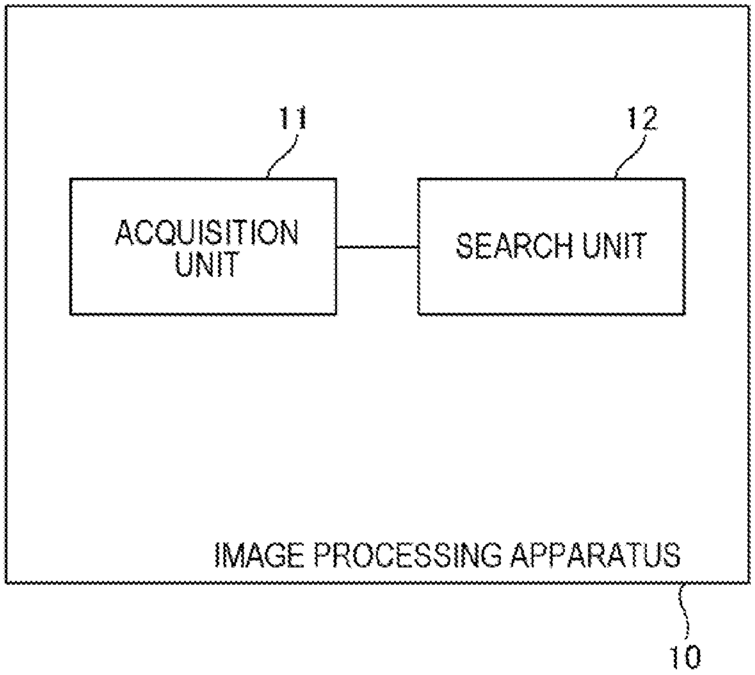
FIG. 1 is a diagram illustrating one example of a functional block diagram of an image processing apparatus.

FIG. 1 is a functional block diagram illustrating an overview of an image processing apparatus 10 according to a first example embodiment. The image processing apparatus 10 includes an acquisition unit 11 and a search unit 12.

The acquisition unit 11 acquires a search query including pose information indicating a pose of a body of a person and appearance information indicating an appearance of the person. The search unit 12 searches for an intended image from a plurality of reference images by using partial pose information indicating a pose of a part of the body of the person in the pose information included in the search query, and partial appearance information being a part of the appearance information included in the search query.

According to the image processing apparatus 10 having such a configuration, a challenge to improve accuracy of processing of searching for an image including a desired person from a plurality of images can be solved.

Second Example Embodiment

Overview

An image including a desired person can be searched with high accuracy by performing an image search by using various types of information. An image processing apparatus 10 according to the present example embodiment searches for an image including a desired person with high accuracy by performing an image search by using characteristic information that has not been used in a conventional technique. Specifically, the image processing apparatus 10 performs an image search, based on appearance information indicating at least one of "whether a predetermined kind of a wearing object is worn", "whether a predetermined kind of a wearing object is worn on a predetermined portion of a body", "whether a wearing object having a predetermined pattern is worn", and "whether a wearing object having a predetermined pattern is worn on a predetermined portion of a body", and pose information. Details will be described below.

Hardware Configuration

Next, one example of a hardware configuration of the image processing apparatus 10 will be described. Each functional unit of the image processing apparatus 10 is achieved by any combination of hardware and software concentrating on as a central processing unit (CPU) of any computer, a memory, a program loaded into the memory, a storage unit such as a hard disc that stores the program (that can also store a program downloaded from a storage medium such as a compact disc (CD), a server on the Internet, and the like in addition to a program previously stored at a stage of shipping of an apparatus), and a network connection interface. Then, various modification examples of an achievement method and an apparatus thereof are understood by a person skilled in the art.

Figure 2:
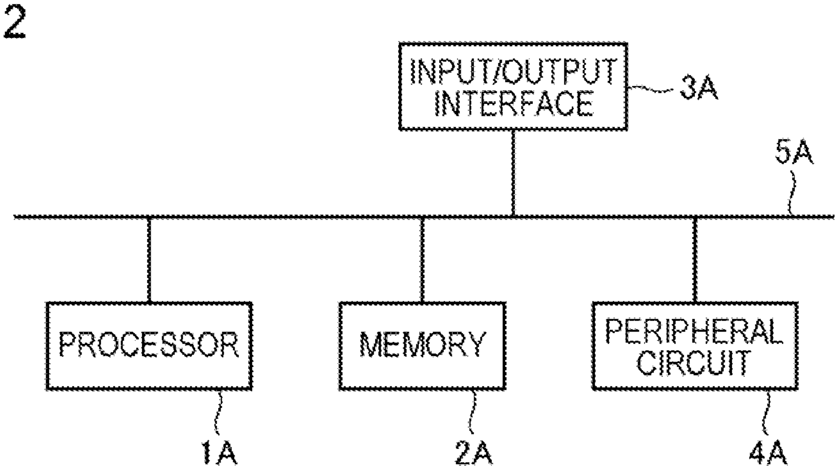
FIG. 2 is a diagram illustrating one example of a hardware configuration example of the image processing apparatus.

FIG. 2 is a block diagram illustrating a hardware configuration of the image processing apparatus 10. As illustrated in FIG. 2, the image processing apparatus 10 includes a processor 1A, a memory 2A, an input/output interface 3A, a peripheral circuit 4A, and a bus 5A. Various modules are included in the peripheral circuit 4A. The image processing apparatus 10 may not include the peripheral circuit 4A. Note that the image processing apparatus 10 may be formed of a plurality of apparatuses being separated physically and/or logically. In this case, each of the plurality of apparatuses can include the hardware configuration described above.

The bus 5A is a data transmission path for the processor 1A, the memory 2A, the peripheral circuit 4A, and the input/output interface 3A to transmit and receive data to and from one another. The processor 1A is an arithmetic processing apparatus such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can output an instruction to each of modules, and perform an arithmetic operation, based on an arithmetic result of the modules.

Functional Configuration

Next, a functional configuration of the image processing apparatus 10 according to the present example embodiment will be described in detail. FIG. 1 is one example of a functional block diagram of the image processing apparatus 10. As illustrated, the image processing apparatus 10 includes an acquisition unit 11 and a search unit 12.

The acquisition unit 11 acquires a search query including pose information indicating a pose of a body of a person and appearance information indicating an appearance of the person. The acquisition unit 11 may acquire, as a search query, an image, or text and numerical data. When an image is acquired, a pose and an appearance of a person included in the image are pose information and appearance information. When text and numerical data are acquired, the text and the numerical data indicate a pose and an appearance of a person. Further, the acquisition unit 11 may analyze an image acquired as a search query, and generate the search query being text and numerical data.

"Pose information" indicates a pose of a body of a person. The pose of a body of a person can be classified into, for example, a standing pose, a sitting pose, and a sleeping pose. In addition, the pose of a body of a person can also be classified into a standing pose with a right hand up, a standing pose with a left hand up, and the like. There are various ways of classification of the pose of a body of a person. The pose information may be information indicating any classification of such a pose.

Figure 3:
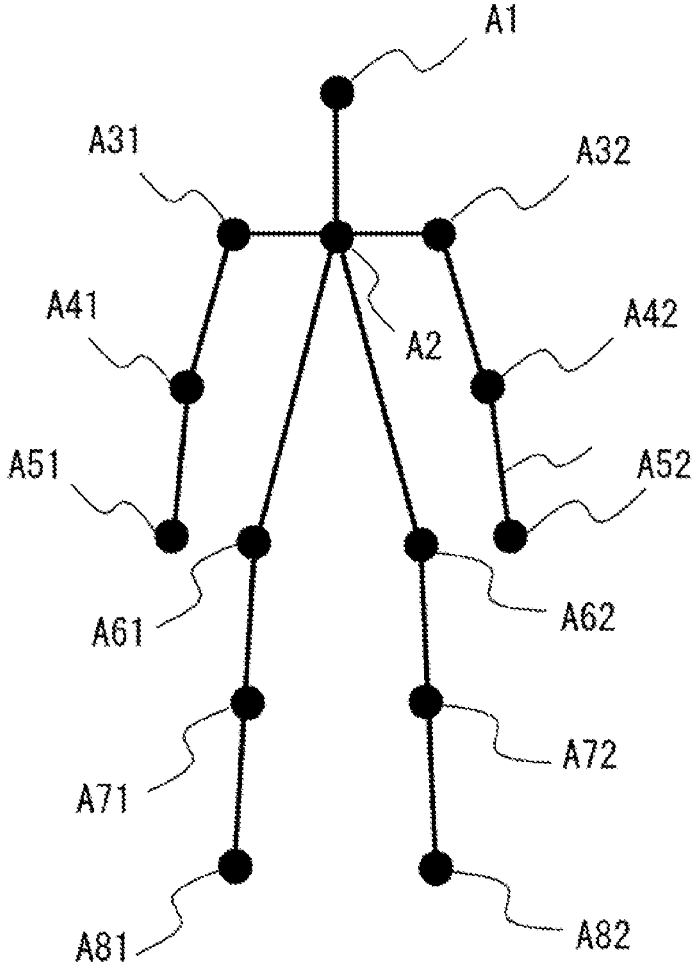
FIG. 3 is a diagram illustrating one example of a keypoint.

In addition, the pose information may be information about a keypoint of a body of a person. For example, as illustrated in FIG. 3, as the keypoint of a body of a person, a head A1, a neck A2, a right shoulder A31, a left shoulder A32, a right elbow A41, a left elbow A42, a right hand A51, a left hand A52, a right waist A61, a left waist A62, a right knee A71, a left knee A72, a right foot A81, a left foot A82, and the like are exemplified. Detection of the keypoint is achieved by using a known technique such as Openpose. As information about the keypoint, for example, information indicating a relative position relationship between a plurality of keypoints, and the like are exemplified, which are not limited thereto.

"Appearance information" indicates an appearance of a person.

The appearance information indicates at least one of
- whether a predetermined kind of a wearing object is worn,
- whether a predetermined kind of a wearing object is worn on a predetermined portion of a body,
- whether a wearing object having a predetermined pattern is worn, and
- whether a wearing object having a predetermined pattern is worn on a predetermined portion of a body. The appearance information may be acquired by combining two or more of these.

A "wearing object" is worn by a person. As a kind of the wearing object, glasses, sunglasses, a hat, a mask, a watch, a headphone, a scarf, gloves, a coat, a shirt, pants, a skirt, shoes, sandals, slippers, and the like are exemplified, which are not limited thereto. Further, a kind of the wearing object exemplified herein may be further fractionalized. For example, a coat may be fractionalized into a trench coat, a duffel coat, a pea coat, and the like according to design.

A "predetermined portion of a body" is a portion that can be determined based on a keypoint of a body detected by using a known technique such as Openpose described above, and, for example, as illustrated in FIG. 3, the head A1, the neck A2, the right shoulder A31, the left shoulder A32, the right elbow A41, the left elbow A42, the right hand A51, the left hand A52, the right waist A61, the left waist A62, the right knee A71, the left knee A72, the right foot A81, the left foot A82, and the like are exemplified. In addition, a portion defined by forming a group of a plurality of keypoints, such as, for example, a "head", an "upper half of a body", a "lower half of a body", a "right half of a body", a "left half of a body", an "upper right half of a body", an "upper left half of a body", a "lower right half of a body", and a "lower left half of a body", is exemplified as one example of a predetermined portion of a body.

Note that, the appearance information may include other information in addition to the information described above. As the other information, every known technique such as face information, gender, an age group, a body shape, a position in an image, and a color of clothing can be adopted.

Herein, a method for acquiring a search query including the pose information and the appearance information as described above will be described. The acquisition unit 11 can acquire a search query by any of first to third acquisition examples below, for example.

First Acquisition Example

In the example, the acquisition unit 11 acquires a still image as a search query. Then, the acquisition unit 11 analyzes the still image, detects a person in the image, and also detects a pose and an appearance of the detected person. Detection of a person, detection of a pose, and detection of an appearance can be achieved by using every conventional technique. In this way, in the example, the acquisition unit 11 analyzes a still image acquired as a search query, and generates the search query being text and numerical data.

Second Acquisition Example

In the example, the acquisition unit 11 acquires a moving image as a search query. The acquisition unit 11 selects a representative frame image from the moving image. Then, the acquisition unit 11 analyzes the representative frame image, detects a person in the image, and also detects a pose and an appearance of the detected person. Detection of a person, detection of a pose, and detection of an appearance can be achieved by using every conventional technique. Further, every technique can be adopted as a method for selecting a representative frame image. In this way, in the example, the acquisition unit 11 analyzes a moving image acquired as a search query, and generates the search query being text and numerical data.

Third Acquisition Example

In the example, the acquisition unit 11 acquires a search query in which a pose and an appearance of a person are specified by text and numerical data. For example, the acquisition unit 11 may receive a user input for selecting one or a plurality of predetermined options (options of a pose and options of an appearance) by using a user interface (UI) part such as a drop-down list. In addition, the acquisition unit 11 may receive a user input for specifying a pose and an appearance by free description by using a UI part such as a text box. When specification by free description is adopted, the acquisition unit 11 may use a prepared word conversion dictionary, and change a description content of a user to a description content suitable for processing by the search unit 12.

The search unit 12 searches for an intended image from a plurality of reference images by using pose information and appearance information included in a search query. The search unit 12 verifies a plurality of reference images stored in a storage unit with the search query, and searches for the intended image, based on a verification result. The plurality of reference images may be a plurality of frame images included in a moving image, or may be a plurality of still images.

An "intended image" is an image including a target person. The target person is a person having a pose indicated by pose information of a search query and having an appearance indicated by appearance information of the search query. For example, when pose information of a search query is a "standing pose", and appearance information of the search query is "wearing a watch on a left hand, male, thirties, wearing red pants", a "person in a standing pose who is male in his thirties wearing a watch on a left hand and wearing red pants" is a target person. Then, an image including such a target person is an intended image.

A verification technique, a reference for deciding matching, and the like are design matters, and every known technique can be adopted. For example, an image analysis may be performed on each of a plurality of reference images, and a pose and an appearance of a person included in each of the reference images may be determined. Then, as illustrated in FIG. 4, information in which pose information and appearance information about the person included in each of the reference images are associated with identification information (reference image identification information) about each of the plurality of reference images may be stored in a storage unit. Then, the search unit 12 may verify pose information and appearance information included in a search query with the pose information and the appearance information about the person included in each of the reference images being stored in the storage unit.

Figure 5:
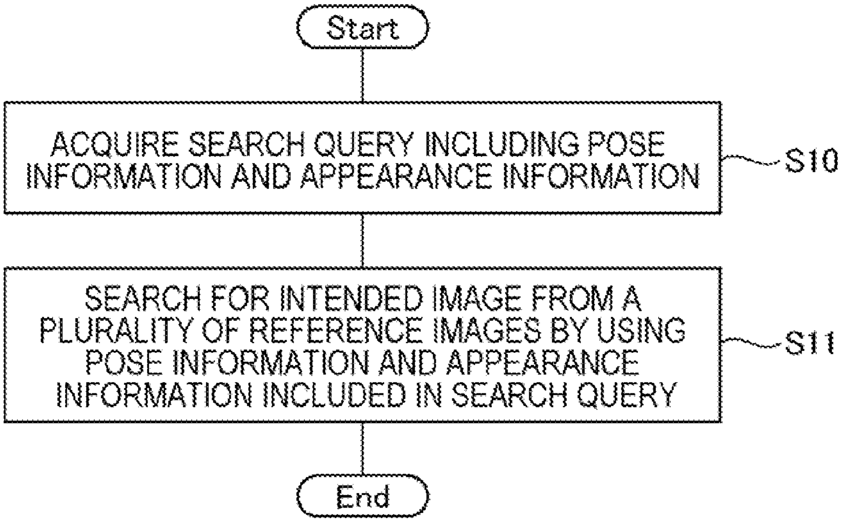
FIG. 5 is a flowchart illustrating one example of a flow of processing of the image processing apparatus.

Next, one example of a flow of processing of the image processing apparatus 10 will be described by using a flowchart in FIG. 5.

First, the image processing apparatus 10 acquires a search query including pose information and appearance information (S10). In the present example embodiment, the appearance information indicates at least one of "whether a predetermined kind of a wearing object is worn", "whether a predetermined kind of a wearing object is worn on a predetermined portion of a body", "whether a wearing object having a predetermined pattern is worn", and "whether a wearing object having a predetermined pattern is worn on a predetermined portion of a body". Note that, the appearance information may indicate other information in addition to at least one of the pieces of information described above.

Subsequently, the image processing apparatus 10 searches for an intended image from a plurality of reference images by using the pose information and the appearance information included in the search query (S11). The intended image is an image including a target person. The target person is a person having a pose indicated by the pose information of the search query and having an appearance indicated by the appearance information of the search query. Then, the image processing apparatus 10 outputs the searched intended image as a search result.

Advantageous Effect

The image processing apparatus 10 according to the present example embodiment searches for a desired intended image by using "both" of appearance information indicating at least one of "whether a predetermined kind of a wearing object is worn", "whether a predetermined kind of a wearing object is worn on a predetermined portion of a body", "whether a wearing object having a predetermined pattern is worn", and "whether a wearing object having a predetermined pattern is worn on a predetermined portion of a body", and pose information. A desired intended image can be searched with high accuracy by performing an image search by using "both" of characteristic appearance information and pose information that have not been used in such a conventional image search.

Further, the image processing apparatus 10 according to the present example embodiment can perform an image search by using appearance information indicating "whether a predetermined kind of a wearing object is worn on a predetermined portion of a body" and "whether a wearing object having a predetermined pattern is worn on a predetermined portion of a body". In other words, a predetermined portion of a person is considered, and an image search can be performed, based on whether a predetermined kind of a wearing object is worn on the portion and whether a wearing object having a predetermined pattern is worn.

Cited Document 1 discloses that an image search is performed based on color information by portion of a person. However, the color information is affected by an environment (such as outside, inside, brightness of a light, and weather) during capturing. Thus, in a case of the technique disclosed in Cited Document 1, accuracy of an image search may decrease.

As in the present example embodiment, an image search is performed by distinguishing, by predetermined portion, "whether a predetermined kind of a wearing object is worn" and "whether a wearing object having a predetermined pattern is worn" that are hardly affected by an environment during capturing, and thus accuracy of the image search improves.

Further, a "predetermined portion of a body" in the present example embodiment can be a content that identifies left and right portions of a body such as a "right hand, a left hand, a right arm, a left arm, a right foot, or a left foot". By detecting a keypoint of a body as described above, left and right portions of the body can be identified. In this way, by identifying left and right portions of a body, and performing an image search in consideration of a wearing object being worn on each portion, a desired intended image can be searched with high accuracy.

Third Example Embodiment

Overview

A desired intended image can be searched with high accuracy by performing an image search by using various types of information such as pose information and appearance information described in the second example embodiment. An input of an image is conceivable as one example of a method for inputting a search query. In this case, when an image in which a part of the various types of information described above is not a desired content is set as a search query, there is a problem that accuracy for searching for an image including a desired person decreases. The problem can be solved by setting, as a search query, an image in which all of the various types of information described above is a desired content. However, it requires a great deal of labor to find an image in which all of the various types of information described above is a desired content.

Thus, an image processing apparatus 10 according to the present example embodiment has a function of performing an image search by using a part specified by a user of pose information and appearance information included in an acquired search query. According to such an image processing apparatus 10, a user inputs, as a search query, an image in which a part of various types of information is a desired content but another part is not a desired content, and also inputs an instruction to perform an image search by using only the information having the desired content, and thus a desired intended image can be searched with high accuracy. As a result, the image in which the part of the various types of information is the desired content but the another part is not the desired content can be used as the search query. Details will be described below.

Hardware Configuration

One example of a hardware configuration of the image processing apparatus 10 according to the present example embodiment is similar to that described in the second example embodiment.

Functional Configuration

Next, a functional configuration of the image processing apparatus 10 according to the present example embodiment will be described in detail. FIG. 1 is one example of a functional block diagram of the image processing apparatus 10. As illustrated, the image processing apparatus 10 includes an acquisition unit 11 and a search unit 12.

A configuration of the acquisition unit 11 is similar to that described in the second example embodiment.

However, definition of "appearance information" in the present example embodiment is slightly different from that in the second example embodiment. As described above, in the second example embodiment, the "appearance information" indicates at least one of "whether a predetermined kind of a wearing object is worn", "whether a predetermined kind of a wearing object is worn on a predetermined portion of a body", "whether a wearing object having a predetermined pattern is worn", and "whether a wearing object having a predetermined pattern is worn on a predetermined portion of a body", and may further include, in addition to this, other information such as face information, gender, an age group, a body shape, a position in an image, and a color of clothing.

The appearance information in the present example embodiment is every information indicating an appearance of a person, and is not limited to indicating at least one of "whether a predetermined kind of a wearing object is worn", "whether a predetermined kind of a wearing object is worn on a predetermined portion of a body", "whether a wearing object having a predetermined pattern is worn", and "whether a wearing object having a predetermined pattern is worn on a predetermined portion of a body" as in the second example embodiment. In other words, the appearance information in the present example embodiment may indicate at least one of "whether a predetermined kind of a wearing object is worn", "whether a predetermined kind of a wearing object is worn on a predetermined portion of a body", "whether a wearing object having a predetermined pattern is worn", and "whether a wearing object having a predetermined pattern is worn on a predetermined portion of a body", and may indicate, in addition to or instead of these, other information such as face information, gender, an age group, a body shape, a position in an image, and a color of clothing.

The search unit 12 searches for an intended image from a plurality of reference images by using partial pose information indicating a pose of a part of a body of a person in pose information included in a search query, and partial appearance information being a part of appearance information included in the search query.

The search unit 12 can extract partial pose information and partial appearance information from a search query by any processing in first to third extraction examples described below, for example.

First Extraction Example

First, the acquisition unit 11 analyzes an image input as a search query, detects a person in the image, then analyzes an entire region in the image in which the person is captured, and detects a pose and an appearance of the detected person.

Figure 6:
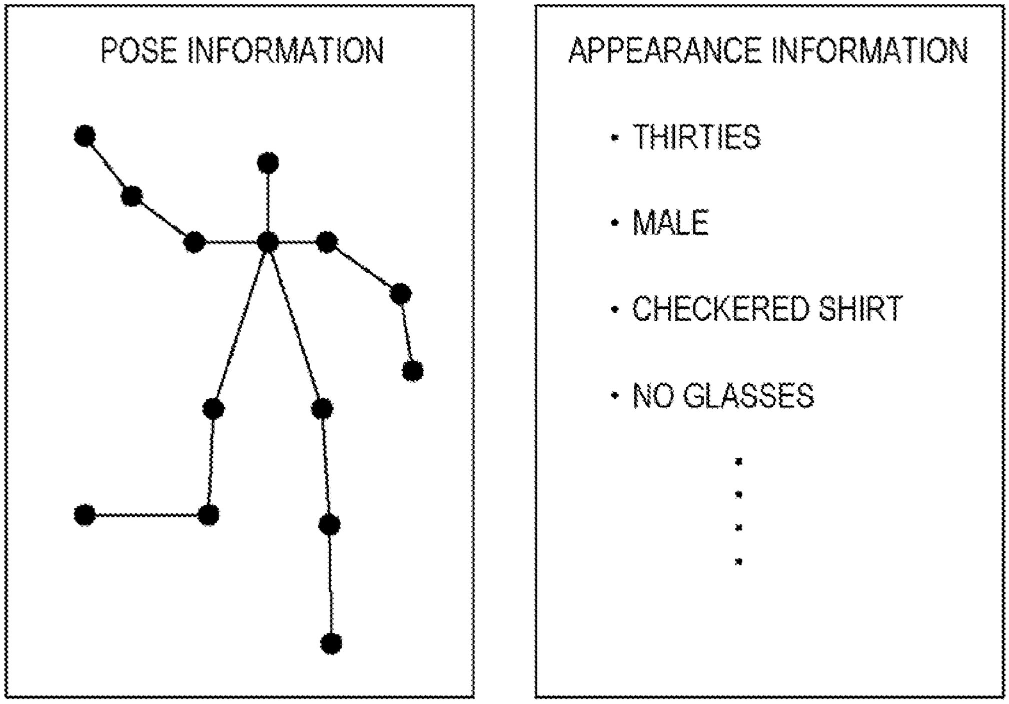
FIG. 6 is a diagram illustrating one example of a screen output from the image processing apparatus.

Then, as illustrated in FIG. 6, the search unit 12 provides (example: displays a screen), to a user, the pose and the appearance of the person detected in the processing described above, and also receives a user input for specifying information to be used for an image search from the pose and the appearance. The user input is achieved via every input apparatus such as a touch panel, a physical button, a microphone, a keyboard, and a mouse.

For example, a user performs an input for specifying a keypoint to be used for an image search among a plurality of keypoints (black dots in FIG. 6) of pose information illustrated in FIG. 6. Then, the search unit 12 generates partial pose information indicated by the specified part of the keypoints.

Further, a user performs an input for specifying a keypoint to be used for an image search among various types of appearance information listed as illustrated in FIG. 6. Then, the search unit 12 generates partial appearance information indicated by the specified part of the appearance information.

Second Extraction Example

Figure 7:
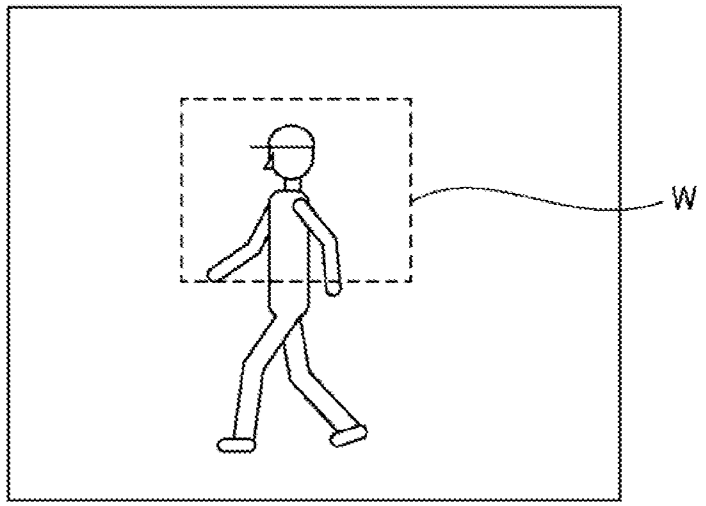
FIG. 7 is a diagram illustrating another example of a screen output from the image processing apparatus.

The acquisition unit 11 displays an image input as a search query on a screen. Then, as illustrated in FIG. 7, the acquisition unit 11 receives a user input for specifying a partial region in the image. In FIG. 7, a region surrounded by a frame W is specified. A user specifies a partial region in such a way as to include a region where desired information is displayed and not include a region where undesired information is displayed. The input for specifying a partial region in an image can be achieved by adopting every known technique.

The acquisition unit 11 analyzes an image in a region specified by a user in an image input as a search query, and detects a pose and an appearance of a person. Then, the search unit 12 acquires, from the acquisition unit 11, partial pose information indicating the pose of the person detected by analyzing a partial region in such an image, and partial appearance information indicating the appearance of the person.

Third Extraction Example

The acquisition unit 11 acquires an image input as a search query, and also receives a user input for specifying a part of a body by a technique different from a "technique for specifying a partial region in an image". For example, the acquisition unit 11 selectably provides, to a user, a name indicating a part of a body, such as an "upper half of a body", a "lower half of a body", a "right half of a body", a "left half of a body", an "upper right half of a body", an "upper left half of a body", a "lower right half of a body", and a "lower left half of a body", and receives a user input for specifying any of the names. The provision and the reception of the user input can be achieved by using a user interface (UI) part such as a drop-down list. In addition, the acquisition unit 11 may receive a user input for specifying a part of a body by free description by using a UI part such as a text box. When specification by free description is adopted, the acquisition unit 11 may use a prepared word conversion dictionary, and change a description content of a user to a description content suitable for processing by the acquisition unit 11.

Then, the acquisition unit 11 determines a region in the image in which the part of the body specified by the user is present, by using pose information (information about a detected keypoint of the body) acquired by analyzing the image. For example, when the "upper half of the body" is specified by the user, the acquisition unit 11 determines a region in the image in such a way as to include a position in which a keypoint, such as the head A1, the neck A2, the right shoulder A31, the left shoulder A32, the right elbow A41, the left elbow A42, the right hand A51, and the left hand A52, is detected, and not include a position in which another keypoint is detected. Information indicating a correspondence between a part of a body and a keypoint included in the part may be stored in advance in the image processing apparatus 10.

Next, the acquisition unit 11 analyzes an image of the determined part described above in the image input as the search query, and detects a pose and an appearance of a person. Then, the search unit 12 acquires, from the acquisition unit 11, partial pose information indicating the pose of the person detected by analyzing a partial region in such an image, and partial appearance information indicating the appearance of the person.

Figure 8:
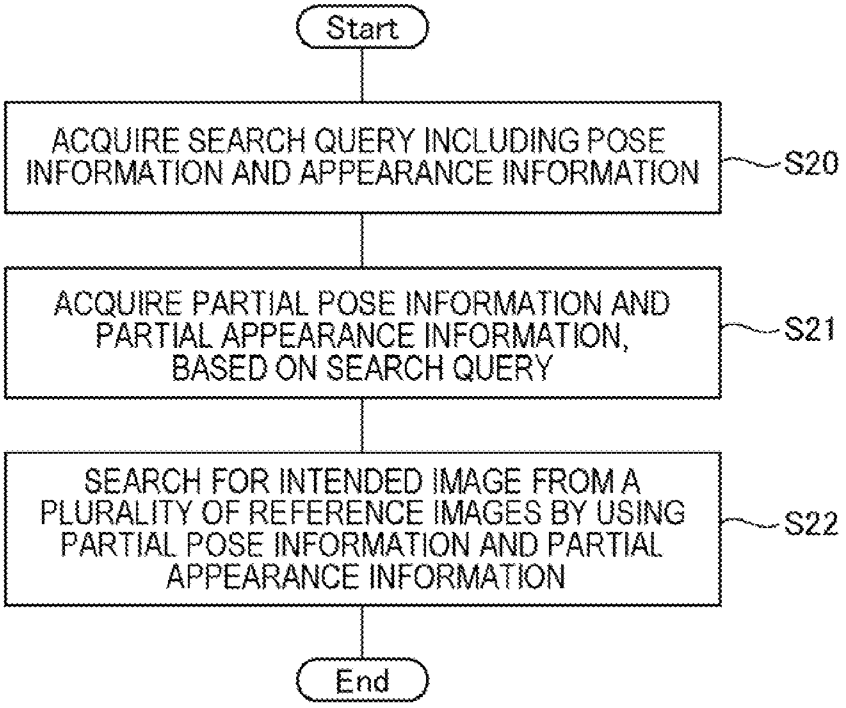
FIG. 8 is a flowchart illustrating another example of a flow of processing of the image processing apparatus.

Next, one example of a flow of processing of the image processing apparatus 10 will be described by using a flowchart in FIG. 8.

When the image processing apparatus 10 acquires a search query including pose information and appearance information (S20), the image processing apparatus 10 acquires partial pose information indicating a pose of a part of a body of a person in the pose information included in the search query, and partial appearance information being a part of the appearance information included in the search query (S21). Then, the image processing apparatus 10 searches for an intended image from a plurality of reference images by using the acquired partial pose information and the acquired partial appearance information (S22). Next, the image processing apparatus 10 outputs a search result.

Figure 9:
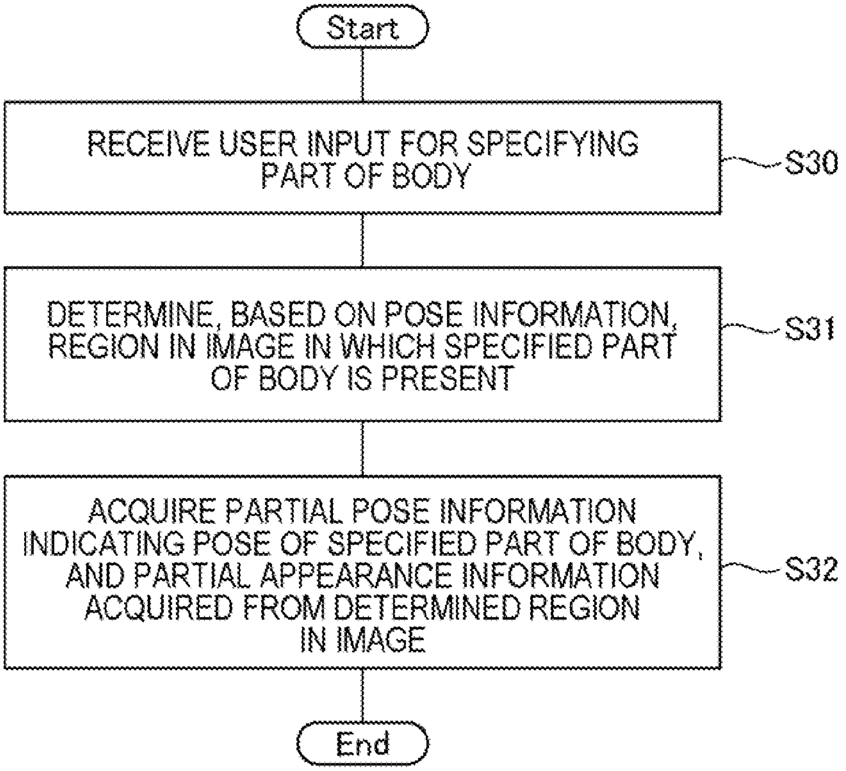
FIG. 9 is a flowchart illustrating another example of a flow of processing of the image processing apparatus.

Next, one example of the processing in S21 will be described by using a flowchart in FIG. 9. Herein, one example of a flow of the processing in the third extraction example described above will be described.

When the image processing apparatus 10 receives a user input for specifying a part of a body of a person (S30), the image processing apparatus 10 determines, based on pose information, a region in which the part of the body specified by the input in S30 is present in an image acquired as a search query (S31). Then, the image processing apparatus 10 analyzes an image of the region determined in S31 in the image acquired as the search query, and acquires partial pose information indicating a pose of the part of the body and partial appearance information indicating an appearance of the person (S32).

Another configuration of the image processing apparatus 10 according to the present example embodiment is similar to that in the first and second example embodiments.

Advantageous Effect

The image processing apparatus 10 according to the present example embodiment can achieve an advantageous effect similar to that in the first and second example embodiments.

Further, the image processing apparatus 10 according to the present example embodiment can perform an image search by using a part specified by a user of pose information and appearance information included in an image acquired as a search query. According to such an image processing apparatus 10, a user inputs, as a search query, an image in which a part of various types of information is a desired content but another part is not a desired content, and also inputs an instruction to perform an image search by using only the information having the desired content, and thus a desired intended image can be searched with high accuracy. As a result, the image in which the part of the various types of information is the desired content but the another part is not the desired content can be used as the search query.

Fourth Example Embodiment

Overview

As described in the second and third example embodiments, an input of an image is conceivable as one example of a method for inputting a search query. In this case, by analyzing the input image, various types of information indicated by the image are determined, and an image is searched by using the determination result.

When various types of information are determined by an image analysis, there may be an error in a content of the determined information. Then, when an image search is performed by using the information having such an error, accuracy of the image search decreases.

Thus, an image processing apparatus 10 according to the present example embodiment searches for an intended image from a plurality of reference images by correcting, by using another, one of pose information and appearance information determined in an analysis of an image input as a search query, and by using the search query after correction. In this way, according to the image processing apparatus 10 in the present example embodiment that appropriately corrects a search query, based on a relationship between pose information and appearance information, accuracy of the search query improves, and, as a result, accuracy of an image search also improves. Details will be described below.

Hardware Configuration

One example of a hardware configuration of the image processing apparatus 10 according to the present example embodiment is similar to that described in the second example embodiment.

Functional Configuration

Figure 10:
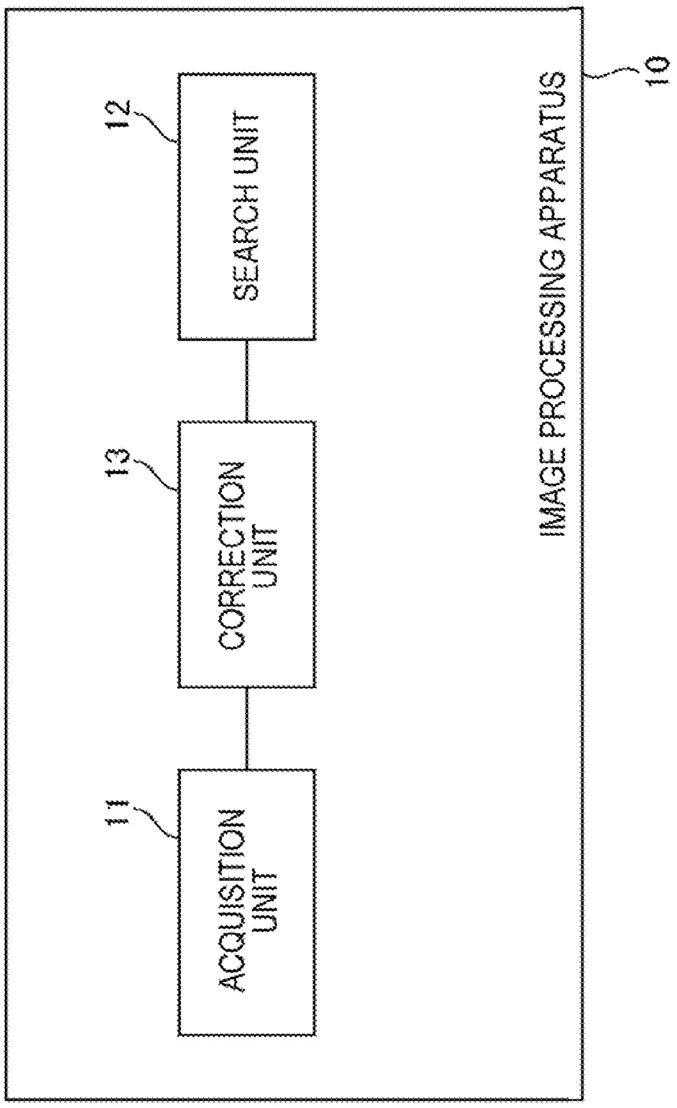
FIG. 10 is a diagram illustrating another example of a functional block diagram of the image processing apparatus.

Next, a functional configuration of the image processing apparatus 10 according to the present example embodiment will be described in detail. FIG. 10 is one example of a functional block diagram of the image processing apparatus 10. As illustrated, the image processing apparatus 10 includes an acquisition unit 11, a search unit 12, and a correction unit 13.

A configuration of the acquisition unit 11 is similar to that in any of the first to third example embodiments. The acquisition unit 11 acquires an image as a search query, analyzes the image, and generates the search query (text and numerical data) including pose information and appearance information.

The correction unit 13 corrects, by using another, one of the pose information and the appearance information included in the search query (text and numerical data) acquired by the acquisition unit 11. In other words, the correction unit 13 can correct the appearance information by using the pose information included in the search query acquired by the acquisition unit 11. Further, the correction unit 13 can correct the pose information by using the appearance information included in the search query acquired by the acquisition unit 11. Hereinafter, one example of correction processing will be described.

Processing Example of Correcting Appearance Information by Using Pose Information Pose information indicates a detection result of a plurality of keypoints of a body of a person. Then, the correction unit 13 corrects appearance information, based on the detection result of the keypoints.

For example, when a predetermined keypoint is not detected, the correction unit 13 can delete, from appearance information, a kind of information associated in advance with the keypoint. In a case of the example, a keypoint of a body and a predetermined kind of appearance information are associated with each other in advance. For example, in association with "keypoint: head A1", appearance information about a wearing object being worn on a face or a head, such as information about a hat, information about glasses, information about sunglasses, and information about a mask, may be associated. In this case, when "keypoint: head A1" is not detected, the correction unit 13 deletes, from the appearance information, the information about the wearing object being worn on the face or the head, such as information about a hat, information about glasses, information about sunglasses, and information about a mask.

As in this example, in association with a keypoint of each portion of a body, by associating appearance information about a wearing object being worn on each portion, when the keypoint of each portion of the body is not detected, information about the wearing object being worn on the portion can be deleted from the appearance information.

As another example, when a predetermined proportion (design matter) or more of a plurality of keypoints included in a part of a body of a person is not detected, the correction unit 13 can delete, from appearance information, a kind of information associated in advance with the part of the body of the person. In a case of the example, a part (such as an upper half of a body, a lower half of a body, a right half of a body, a left half of a body, an upper right half of a body, an upper left half of a body, a lower right half of a body, and a lower left half of a body) of a body and a predetermined kind of appearance information are associated with each other in advance. For example, in association with an "upper half of a body", appearance information about a wearing object being worn on an upper half of a body, such as information about a hat, information about glasses, information about sunglasses, information about a mask, information about gloves, information about a scarf, and information about a jacket, may be associated. In this case, when a predetermined proportion or more of a plurality of keypoints included in the upper half of the body is not detected, the correction unit 13 deletes, from the appearance information, the information about the wearing object being worn on the upper half of the body, such as information about a hat, information about glasses, information about sunglasses, information about a mask, information about gloves, information about a scarf, and information about a jacket.

As in this example, in association with each portion of a body, by associating appearance information about a wearing object being worn on each portion, when a predetermined proportion or more of a plurality of keypoints included in a part of the body is not detected, information about the wearing object being worn on the part can be deleted from the appearance information.

Processing Example of Correcting Pose Information by Using Appearance Information In a case of the example, a keypoint of a body and a predetermined kind of appearance information are associated with each other in advance. For example, in association with "keypoint: head A1", appearance information about a wearing object being worn on a face or a head, such as information about a hat, information about glasses, information about sunglasses, and information about a mask, may be associated.

Then, when reliability of information about a part of a body of a person in the appearance information satisfies a predetermined condition, the correction unit 13 deletes the information about the part of the body of the person from pose information.

In a case where there are a plurality of kinds of appearance information about a part of a body of a person, when reliability of at least one of the plurality of kinds of the appearance information satisfies a predetermined condition, when reliability of all of the plurality of kinds of the appearance information satisfies the predetermined condition, or when a predetermined proportion or more of the plurality of kinds of the appearance information satisfies the predetermined condition, the correction unit 13 deletes the information about the part of the body of the person from pose information.

For example, when reliability of at least one of pieces of appearance information about a wearing object being worn on a face or a head, such as information about a hat, information about glasses, information about sunglasses, and information about a mask, is less than a reference value (predetermined condition), the correction unit 13 can delete information about "keypoint: head A1" from pose information.

As another example, when reliability of all of pieces of appearance information about a wearing object being worn on a face or a head, such as information about a hat, information about glasses, information about sunglasses, and information about a mask, is less than a reference value (predetermined condition), the correction unit 13 can delete information about "keypoint: head A1" from pose information.

As another example, when reliability of a predetermined proportion or more of appearance information about a wearing object being worn on a face or a head, such as information about a hat, information about glasses, information about sunglasses, and information about a mask, is less than a reference value (predetermined condition), the correction unit 13 can delete information about "keypoint: head A1" from pose information.

The reliability is a value indicating a degree of reliability of a result of an image analysis, and every known technique can be adopted as a computation means of the reliability.

The search unit 12 searches for an intended image from a plurality of reference images by using a search query after correction.

Figure 11:
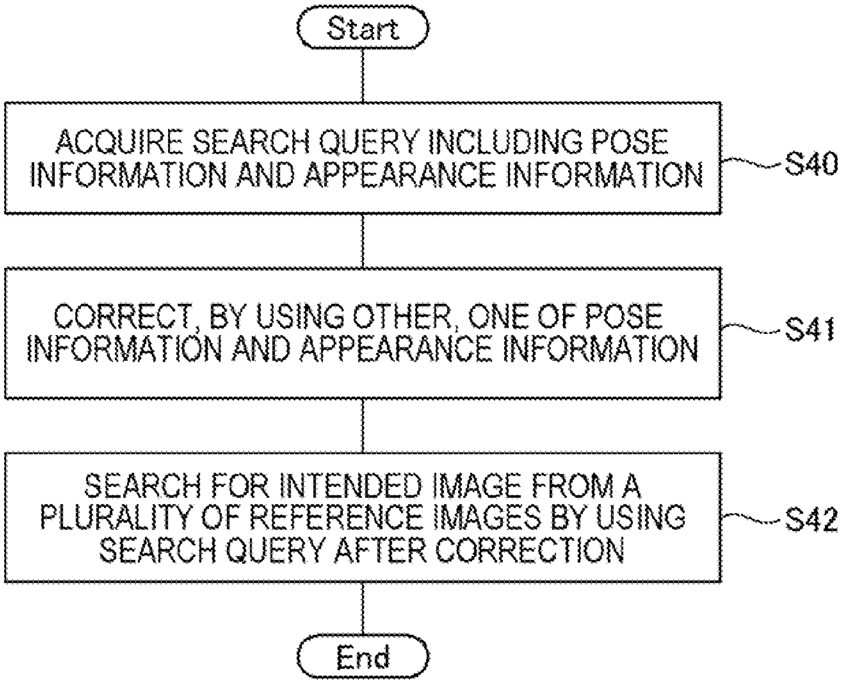
FIG. 11 is a flowchart illustrating another example of a flow of processing of the image processing apparatus.

Next, one example of a flow of processing of the image processing apparatus 10 will be described by using a flowchart in FIG. 11.

First, the image processing apparatus 10 acquires a search query including pose information indicating a pose of a person and appearance information indicating an appearance of the person (S40). Specifically, the image processing apparatus 10 acquires an image as a search query, analyzes the image, and generates the search query being text and numerical data.

Next, the image processing apparatus 10 corrects, by using another, one of the pose information and the appearance information included in the search query being text and numerical data (S41). Then, the image processing apparatus 10 searches for an intended image from a plurality of reference images by using the search query (search query being text and numerical data) after correction (S42). Next, the image processing apparatus 10 outputs a search result.

Another configuration of the image processing apparatus 10 according to the present example embodiment is similar to that in the first to third example embodiments.

Advantageous Effect

The image processing apparatus 10 according to the present example embodiment can achieve an advantageous effect similar to that in the first to third example embodiments.

Further, the image processing apparatus 10 according to the present example embodiment can perform an image search by correcting, by using another, one of pose information and appearance information acquired by analyzing an image acquired as a search query, and by using the search query after correction. When pose information and appearance information are generated by an image analysis, there may be an error in the generated pose information and the generated appearance information. Then, when an image search is performed by using the information having such an error, accuracy of the image search decreases.

Thus, the image processing apparatus 10 according to the present example embodiment searches for an intended image from a plurality of reference images by correcting, by using another, one of pose information and appearance information determined in an analysis of an image input as a search query, and by using the search query after correction. In this way, according to the image processing apparatus 10 in the present example embodiment that appropriately corrects a search query, based on a relationship between pose information and appearance information, accuracy of the search query improves, and, as a result, accuracy of an image search also improves.

Modification Example

Hereinafter, modification examples that are applicable to the first to fourth example embodiments will be described. An advantageous effect similar to that in the first to fourth example embodiments is also achieved in the modification examples.

Modification Example 1

In the example, the image processing apparatus 10 searches for an intended image from a plurality of reference images by verifying reference image appearance information and reference image pose information that are acquired by analyzing a reference image with appearance information and pose information included in a search query. The reference image appearance information indicates an appearance of a person included in the reference image. The reference image pose information indicates a pose of the person included in the reference image.

Then, the image processing apparatus 10 corrects, by using the technique described in the fourth example embodiment, the reference image appearance information and the reference image pose information that are acquired by analyzing the reference image.

In other words, the correction unit 13 corrects, by using another, one of the reference image pose information indicating the pose of the person and the reference image appearance information indicating the appearance of the person, which are generated based on the reference image. A method of correction is as described in the fourth example embodiment.

For example, when a predetermined keypoint is not detected, the correction unit 13 may delete, from reference image appearance information, a kind of information associated in advance with the keypoint.

In addition, when a predetermined proportion or more of a plurality of keypoints included in a part of a body of a person is not detected, the correction unit 13 may delete, from reference image appearance information, a kind of information associated in advance with the part of the body of the person.

In addition, when reliability of information about a part of a body of a person in reference image appearance information satisfies a predetermined condition, the correction unit 13 may delete the information about the part of the body of the person from reference image pose information.

Modification Example 2

In the example, the image processing apparatus 10 searches for an intended image from a plurality of reference images by verifying reference image appearance information and reference image pose information that are acquired by analyzing a reference image with appearance information and pose information included in a search query.

Then, the search unit 12 does not set, as an intended image, a reference image in which a plurality of keypoints of the same kind are detected from one person region among the plurality of reference images.

The "person region" is a region (example: rectangular region) having a predetermined shape in which a person is detected. A technique for detecting a region having a predetermined shape as the person region is widely known.

A case where a "plurality of keypoints of the same kind are detected from one person region" is, for example, a case where a plurality of keypoints of "head A1" are detected from one person region, and the like.

Since accuracy of reference image appearance information and reference image pose information that are acquired by analyzing such a reference image is low, the search unit 12 does not set the reference image as an intended image. The search unit 12 may exclude the reference image from a verification target of a search query in advance. In addition, the search unit 12 may verify the reference image with a search query, but may exclude the reference image from an intended image regardless of the result.

Modification Example 3

When appearance information of a search query indicates that a predetermined kind of a wearing object is worn, and the predetermined kind of the wearing object is not detected from a person included in a reference image, the search unit 12 decides whether the person is wearing the predetermined kind of the wearing object, based on information indicating a pose of a body of the person included in the reference image.

Specifically, when a pose of a body of the person included in the reference image is a pose facing in a first direction, the search unit 12 decides that the person included in the reference image does not wear the predetermined kind of the wearing object. On the other hand, when a pose of a body of the person included in the reference image is a pose facing in a second direction, the search unit 12 decides that it is unclear whether the person included in the reference image is wearing the predetermined kind of the wearing object.

Herein, the processing will be specifically described with, as an example, a case where "wearing glasses" is indicated in a search query. In this example, when a predetermined kind of a wearing object (glasses) is not detected from a person included in a reference image, (1) a case where the glasses are not detected because the person is not wearing the glasses in the first place, and (2) a case where the glasses are not detected because the person is facing rearward are conceivable. There is no problem that it is decided in the case of (1) that the search query of "wearing glasses" is not satisfied, but there may be a case where it is not preferable to decide that the search query of "wearing glasses" is not satisfied in the case of (2).

Thus, the search unit 12 identifies whether a case is the case of (1) or the case of (2) by using pose information. Then, in the case of (1), the search unit 12 decides that the person included in the reference image is not wearing the predetermined kind of the wearing object (glasses), and, in the case of (2), the search unit 12 decides that it is unclear whether the person included in the reference image is wearing the predetermined kind of the wearing object (glasses).

The search unit 12 determines whether the person is facing in the first direction or the second direction, based on the pose information, and decides whether a case is the case of (1) or the case of (2), based on the determination result. Specifically, the search unit 12 decides the case of (1) when the person is facing in the first direction, and decides the case of (2) when the person is facing in the second direction.

The first direction and the second direction vary according to a kind of a wearing object and a wearing position.

In a case of a wearing object being worn on a face, such as glasses, sunglasses, and a mask, the first direction is a forward direction (a face is facing a camera), and the second direction is a rearward direction (a face is not facing the camera). Whether the other direction such as a horizontal direction is included in the first direction or the second direction is a design matter.

Further, in a case of a watch worn on a left hand, the first direction is a forward direction, a rearward direction, and a right direction (right direction toward a camera), and the second direction is a left direction (left direction toward the camera).

Note that, how a reference image decided unclear whether to be matched in at least one piece of appearance information included in a search query (unclear whether a predetermined kind of a wearing object is worn) is handled is a design matter.

For example, a reference image decided to be matched with a search query except for an item decided unclear may be set as an intended image. In other words, the reference image may also be displayed as a reference image matched with a search query on a screen of a search result.

In addition, a reference image decided to be matched with a search query except for an item decided unclear may be extracted as a candidate for an intended image. Then, such a reference image may be displayed as the candidate for the intended image by being distinguished from the intended image on a screen of a search result.

Modification Example 4

The search unit 12 narrows down reference images verified with a search query, based on a content of the search query.

Specifically, in the modification example, each of a plurality of reference images is analyzed in advance, and, as illustrated in FIG. 4, information in which pose information and appearance information about a person included in each of the reference images are associated with identification information (reference image identification information) about each of the plurality of reference images is stored in a storage unit. Further, a keypoint of a body and a kind of appearance information about a wearing object being worn on a portion of the keypoint of the body are associated with each other in advance.

Then, when the search unit 12 analyzes a search query and determines the appearance information about which portion of the body being included, the search unit 12 extracts a reference image including the determined kind of the appearance information from the reference images. Then, the search unit 12 verifies the extracted reference image with the search query.

While the example embodiments of the present invention have been described with reference to the drawings, the example embodiments are only exemplification of the present invention, and various configurations other than the above-described example embodiments can also be employed. The configurations of the example embodiments described above may be combined together, or a part of the configuration may be replaced with another configuration. Further, various modifications may be made in the configurations of the example embodiments described above without departing from the scope of the present invention. Further, the configurations and the processing disclosed in each of the example embodiments and the modification examples described above may be combined together.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiments may also be described in supplementary notes below, which is not limited thereto.

1. An image processing apparatus including:
   - an acquisition unit that acquires a search query including pose information indicating a pose of a body of a person and appearance information indicating an appearance of a person; and
   - a search unit that searches for an intended image from a plurality of reference images by using partial pose information indicating a pose of a part of a body of a person in the pose information included in the search query, and partial appearance information being a part of the appearance information included in the search query.
2. The image processing apparatus according to supplementary note 1, wherein
   - the acquisition unit acquires an image as the search query, analyzes the image, and generates the partial pose information and the partial appearance information.
3. The image processing apparatus according to supplementary note 2, wherein
   - the acquisition unit
     - determines, based on the pose information, a partial region in the image in which a part of a body of a person specified by a user is present, and
     - analyzes the determined partial region in the image, and generates the partial pose information and the partial appearance information.
4. The image processing apparatus according to supplementary note 2, wherein the acquisition unit analyzes a partial region in the image specified by a user, and generates the partial pose information and the partial appearance information.

5. The image processing apparatus according to any of supplementary notes 1 to 4, wherein,
when the appearance information of the search query indicates that a predetermined kind of a wearing object is worn, and the predetermined kind of the wearing object is not detected from a person included in the reference image, the search unit decides whether the person is wearing the predetermined kind of the wearing object, based on information indicating a pose of a body of the person included in the reference image.

6. The image processing apparatus according to supplementary note 5, wherein
the search unit
decides that a person included in the reference image is not wearing the predetermined kind of the wearing object when a pose of a body of the person included in the reference image is a pose facing in a first direction, and
decides that it is unclear whether the person included in the reference image is wearing the predetermined kind of the wearing object when a pose of a body of the person included in the reference image is a pose facing in a second direction.

7. The image processing apparatus according to any of supplementary notes 1 to 5, wherein
the search unit
analyzes the reference image including a person, detects a plurality of keypoints of a body of the person, and generates reference image pose information indicating a pose of the body of the person, based on a detection result of the keypoints,
analyzes the reference image, and generates reference image appearance information indicating an appearance of the person, and
corrects the generated reference image pose information, based on reliability of the reference image appearance information.

8. The image processing apparatus according to supplementary note 7, wherein,
when reliability of the reference image appearance information about a part of a body of a person satisfies a predetermined condition, the search unit deletes information about the part of the body of the person from the reference image pose information.

9. An image processing method including,
by one or more computers:
acquiring a search query including pose information indicating a pose of a body of a person and appearance information indicating an appearance of a person; and
searching for an intended image from a plurality of reference images by using partial pose information indicating a pose of a part of a body of a person in the pose information included in the search query, and partial appearance information being a part of the appearance information included in the search query.

10. A program causing a computer to function as:
an acquisition unit that acquires a search query including pose information indicating a pose of a body of a person and appearance information indicating an appearance of a person; and
a search unit that searches for an intended image from a plurality of reference images by using partial pose information indicating a pose of a part of a body of a person in the pose information included in the search query, and partial appearance information being a part of the appearance information included in the search query.

10 Image processing apparatus
11 Acquisition unit
12 Search unit
13 Correction unit
1A Processor
2A Memory
3A Input/output I/F
4A Peripheral circuit
5A Bus

The invention claimed is:

1. An image processing apparatus comprising:
at least one memory configured to store one or more instructions; and
at least one processor configured to execute the one or more instructions to:
acquire a search query including pose information indicating a pose of a first body of a first person and appearance information indicating an appearance of the first person; and
search for an intended image from a plurality of reference images by using partial pose information indicating a pose of a part of the first body of the first person in the pose information included in the search query, and partial appearance information being a part of the appearance information included in the search query.

2. The image processing apparatus according to claim 1, wherein
the at least one processor is further configured to execute the one or more instructions to acquire an image as the search query, analyze the image, and generate the partial pose information and the partial appearance information.

3. The image processing apparatus according to claim 2, wherein
the at least one processor is further configured to execute the one or more instructions to
determine, based on the pose information, a partial region in the image in which a part of a second body of a second person specified by a user is present, and
analyze the determined partial region in the image, and generate the partial pose information and the partial appearance information.

4. The image processing apparatus according to claim 2, wherein
the at least one processor is further configured to execute the one or more instructions to analyze a partial region in the image specified by a user, and generate the partial pose information and the partial appearance information.

5. The image processing apparatus according to claim 1, wherein the at least one processor is further configured to execute the one or more instructions to:
when the appearance information of the search query indicates that a predetermined kind of a wearing object is worn, and the predetermined kind of the wearing object is not detected from a third person included in the reference image, decide whether the third person is wearing the predetermined kind of the wearing object, based on information indicating a pose of a third body of the third person included in the reference image.

6. The image processing apparatus according to claim 5, wherein the at least one processor is further configured to execute the one or more instructions to:

decide that the third person included in the reference image is not wearing the predetermined kind of the wearing object when the pose of the third body of the third person included in the reference image is a pose facing in a first direction, and decide that it is unclear whether the third person included in the reference image is wearing the predetermined kind of the wearing object when the pose of the third body of the third person included in the reference image is a pose facing in a second direction.

7. The image processing apparatus according to claim 1, wherein the at least one processor is further configured to execute the one or more instructions to:

analyze the reference image including a third person, detect a plurality of keypoints of a third body of the third person, and generate reference image pose information indicating a pose of the third body of the third person, based on a detection result of the keypoints, analyze the reference image, and generate reference image appearance information indicating an appearance of the third person, and correct the generated reference image pose information, based on reliability of the reference image appearance information.

8. The image processing apparatus according to claim 7, wherein the at least one processor is further configured to execute the one or more instructions to:

when reliability of the reference image appearance information about a part of the third body of the third person satisfies a predetermined condition, delete information about the part of the third body of the third person from the reference image pose information.

9. The image processing apparatus according to claim 1, wherein the at least one processor is further configured to execute the one or more instructions to acquire the search query including both the pose information and the appearance information; and search for the intended image from the plurality of reference images by using both the partial pose information and the partial appearance information.

10. An image processing method comprising, by one or more computers:

acquiring a search query including pose information indicating a pose of a first body of a first person and appearance information indicating an appearance of the first person; and searching for an intended image from a plurality of reference images by using partial pose information indicating a pose of a part of the first body of a the first person in the pose information included in the search query, and partial appearance information being a part of the appearance information included in the search query.

11. A non-transitory storage medium storing a program causing a computer to:

acquire a search query including pose information indicating a pose of a body of a person and appearance information indicating an appearance of the person; and search for an intended image from a plurality of reference images by using partial pose information indicating a pose of a part of the body of the person in the pose information included in the search query, and partial appearance information being a part of the appearance information included in the search query.

* * * * *